United States Patent Office 3,361,732
Patented Jan. 2, 1968

3,361,732
METHOD FOR CONCENTRATION OF BLOOD PROTEIN SOLUTIONS EMPLOYING METHANOL AND FLASH EVAPORATION
William H. Dazey and Alexander Koehler, Lebanon, Ind., assignors to The Dow Chemical Company, Midland, Mich., a corporation of Delaware
No Drawing. Filed July 28, 1964, Ser. No. 385,758
7 Claims. (Cl. 260—112)

ABSTRACT OF THE DISCLOSURE

Method for concentrating a blood-protein fraction from aqueous, methanolic solution and freeing same of volatile contaminants by spreading said solution as a thin, rapidly-moving film at a temperature of from about −6° to about 25° C., but above the freezing point of said solution, and subjecting said film to vacuum while supplying sufficient heat to the film to maintain same in the liquid state.

---

This invention is concerned with blood fractionation and is particularly directed to a method for preparing a concentrated aqueous solution of a purified blood protein free of volatile contaminants.

In recent years, the separation and concentration of blood protein fractions has been of interest for a variety of uses. In particular, the separation of the gamma globulin fraction of blood, both from man and other mammals, has become of increasing importance for the reason that this fraction contains a preponderance of the antibody materials. Such antibodies constitute the primary mechanism by which the body combats infections, particularly with viral agents, and it has been found that the injection of the gamma globulin fraction from pooled blood into a susceptible individual can aid the latter in combatting disease. Various schemes for separating the different blood fractions have been proposed. Where the fractionation is accomplished by variation of pH and salt concentrations, it has generally been necessary to use time-consuming and expensive methods such as dialysis to free the final product from contamination with the salt or salts employed in the precipitation steps.

In recent years, fractionation schemes based on adding various concentrations of an alcohol, to precipitate blood fractions selectively, have been widely employed. Various methods for such fractionation of blood proteins have been proposed. The methods may vary somewhat depending upon the source of the blood plasma. Thus, for example, plasma may be obtained from outdated blood in blood banks, in which case the plasma is separated from the formed elements, such as red cells, by centrifugation, decantation or the like. Alternatively, the blood proteins may be obtained by saline extraction of finely ground placentae, in which case placental debris and formed elements of the blood are removed by filtration and/or by centrifugation or decantation to obtain the clear solution of blood proteins. In the case of blood from animals other than humans, for example in preparing hyperimmune serum from dogs, the blood supply is generally obtained by direct bleeding of the hyperimmune animals and the plasma is separated therefrom in conventional fashion.

Commercial methods of separating the various protein fractions of blood, employing alcohol as a precipitant, are generally based on the methods set forth by Cohn in U.S. Patents 2,390,074 and 2,469,193. Such methods have been detailed by Cohn et al. in J. Am. Chem. Soc., vol. 68, pages 459–475 (1946). Modifications of the Cohn method are set forth in U.S. Patents 2,710,293, 2,710,-294 and 2,436,060 and in Deutsch et al., J. Biol. Chem., vol. 164, pages 109–118 (1946). The latter two references teach an improved method for separating a purified gamma globulin fraction from blood as a paste containing from 75 to 80 percent of the gamma globulins in the starting material. In general, in these prior commercial methods, it has been preferred to employ ethanol at adjusted concentrations to precipitate the various protein fractions.

The above-described fractionation schemes require that all the added alcohol be removed from the final product. It has been the substantially universal practice to accomplish the removal of the alcohol by lyophilizing the final precipitated paste of gamma globulin. Lyophilization involves freezing the paste in relatively thin films, and removing volatile matter therefrom under high vacuum while the product is maintained in frozen condition. This lyophilization step is tedious, expensive and time-consuming. Further, said lyophilization step removes substantially all of the water from the protein fraction concurrently with the desired removal of alcohol. It has been found that such removal of substantially all the water, even at the very low temperatures employed, results in some denaturation of the active blood fractions. Such denaturation results in a decrease in yield and potency when the blood fraction is resuspended and clarified to produce an injectable product.

In view of the above-described problems in present commercial methods of blood fractionation, it would be desirable to produce aqueous gamma globulin and other blood fractions freed of alcohol without the necessity for the intensive desiccation produced by lyophilization. Likewise, it would be advantageous to avoid lyophilization completely since the latter process is inherently costly and time-consuming.

It is an object of the present invention to provide a method for removing alcohol from blood fractions without the necessity of freeze-drying such fractions. It is another object to provide a method for finishing an injectable gamma globulin product in aqueous solution without requiring lyophilization. A further object of the invention is to provide a novel method for concentrating globulin fractions produced by the alcohol precipitation technique without desiccating the protein fraction. Other objects will become apparent from the following specification and claims.

In accordance with the invention, it has been discovered that concentrated stable solutions of protein fractions freed of alcohol can be produced by flash evaporation under vacuum at temperatures above the freezing point of the protein solution provided that methanol is employed as the precipitant in the prior fractionation. In such operations it is critical to maintain a thin, rapidly flowing film of the liquid, aqueous protein fraction in contact with a heated surface in order to accomplish removal of volatiles such as methanol along with excess water with a minimum contact time. The preparation of a concentrated, substantially pure aqueous gamma globulin solution by the foregoing method constitutes a preferred embodiment of the invention.

In carrying out the invention, blood proteins are separated into discrete fractions by adjustment of hydrogen-ion concentration and alcohol concentration substantially as described in the above patents and publications except that methanol is employed in place of the ethanol usually specified as the alcohol of choice in said patents and publications. By suitable choice of conditions, said fractions can be isolated as solutions of said fractions or as moist, pasty precipitates of said fractions. Such precipitates can be resuspended in distilled, pyrogen-free water to form slutions. The term "solution," as applied to dispersions of proteins in the present specification and claims, is inclusive of stable colloidal dispersions as well as of conventional solutions.

In the prior procedures whenever the blood-protein fractions were separated, it has been necessary to employ tedious and expensive processes such as freeze-drying or dialysis to free such fractions of the precipitating alcohol. In the present process, however, it has been found that such fractions are freed of methanol with surprising facility by spreading an aqueous solution of the desired fraction in the form of a thin, rapidly flowing film under partial vacuum on a heated surface to accomplish flash evaporation of methanol and excess water with a minimum contact time of the solution with said surface. Contact times of less than 30 seconds, preferably of from about 5 to 10 seconds, have been found desirable. Advantageously, the vacuum is drawn with an aspirator or other continuously acting pump to maintain an absolute pressure of from about 20 to 25 millimeters of mercury in the space proximal to said heated surface. The heated surface should be of a readily sterilizable and conductive material and such as to avoid introduction of undesirable contaminants into the protein solutions. Stainless steel provides the surface of choice for this use.

In practice it has been found that with proper adjustments for regulating heat input, any of various commercially available thin film evaporators can be adapted for the flash evaporation step of the present process. Thus, evaporators such as the Turba-Film Evaporator (Rodney-Hunt Machine Company) and similar evaporators offered by the Luwa Corporation or a Pfaudler Wiped Film Evaporator may be employed. Such apparatus generally employs mechanical means for spreading and maintaining the liquid to be concentrated as a thin, rapidly flowing film on the heated surface in the evaporator. In general, the heated surface is the internal surface of a metal cylinder and heat is supplied by circulating steam or hot water or the like in a jacket external to said cylinder. In carrying out the process of the present invention, it is essential that the heat input to the heated surface be adjusted to supply the heat removed, primarily as latent heat of vaporization, during the flash evaporation of the solvent from the protein solution. If too little heat is supplied, the solution will freeze up in the evaporator. On the other hand, excessive heat input may result in denaturation of desirable proteins. In practice, it has been found advantageous to supply heat by introducing dry steam into the jacket of the evaporator while drawing sufficient vacuum on the exit from the jacket to maintain the evaporator surface at a temperature of from about 65° to about 85° C.

The protein fractions separated by the usual methods but using methanol as in the present process are generally obtained at relatively low temperatures and can be introduced into the flash evaporator directly as so-obtained. The maximum input temperature is governed by the concentration of methanol in the protein solution and by the nature of the particular protein fraction involved. Thus, in general for most proteins, higher input temperatures may be employed with lower concentrations of methanol without danger of denaturation of the protein. For any particular protein and methanol concentration, the maximum allowable input temperature can be predetermined by preliminary tests. In general, with solutions containing 15 percent or more of methanol, it is desirable to maintain the input temperature at about 0° C. or below. With low concentrations of methanol, that is, below about 5 percent, input temperatures ranging up to about 25° C. may be employed, particularly with protein fractions having good thermal stability. Output temperatures from the evaporator can be controlled over a wide range depending on the rate of feed of solution to the evaporator, the rate of heat input to the heated surface, the methanol content of the feed solution and the degree of vacuum drawn in the interior of the evaporator. Thus, for example, with a high evaporation rate and low heat input, the exit temperature may even be controlled to be below the input temperature. In general, however, it is convenient to control the above-described variables to provide for an exit temperature for the methanol-free solution in the range of from about 15° to about 30° C. In the preparation of gamma globulin concentrates, an exit temperature of from about 17° to about 22° C. is preferred.

The percentages of methanol specified in the following examples and in the claims are percent by volume.

The following examples illustrate the invention but are not to be construed as limiting the same.

EXAMPLE 1

Human placentae, which have been quick-frozen shortly after delivery and thereafter maintained frozen, are finely ground in the frozen state. The resulting pulp is extracted with physiological saline solution at the rate of 180 liters of saline solution per 250 placentae. Paper pulp in the amount of 10 grams per placenta is added to the resulting slurry and the slurry is then submitted to sedimentation and centrifugation to separate placental tissue and formed elements of the blood and to yield a clarified placental extract containing substantially all of the serum proteins of the placental blood.

The clarified placental extract is cooled to about 0° C. and cold methanol added thereto with stirring and continued cooling to produce a mixture containing 25 percent of methanol at a temperature of −6° C. and at a pH in the range of 6.8 to 7.2. This concentration of methanol causes precipitation of a protein fraction including the beta- and gamma-globulins and part of the alpha-globulins. The precipitate is separated from the supernatant liquid by centrifuging at a rate of about 30 liters per hour while maintaining the throughput at a temperature of from about −4° to about −6° C.

The supernatant liquid consisting of a methanolic aqueous solution containing substantially all the serum albumins and a part of the alpha-globulins is diluted with pyrogen-free water at about 0° C. and fed to a Pfaudler wiped, thin-film evaporator operating under a vacuum (absolute pressure of 20 to 22 millimeters of mercury) and having the heated surface at a temperature of about 70° C. The rate of output is adjusted so as to withdraw a concentrated solution of said serum albumin and alpha-globulins, freed of methanol, at an exit temperature of about 40° C. This concentrate from placental material is contaminated with hemoglobin from hemolysis of the red blood cells and is thus not suitable for intravenous injection without further processing. If, however, plasma from fresh blood or properly preserved blood is employed as the starting material, the resulting methanol-free concentrate obtained by the above procedure may be heated to inactivate viruses and sterilized by passing through a bacteriological filter to produce a material suitable for intravenous injection to combat shock and the like.

EXAMPLE 2

The precipitate from Example 1 was taken up in pyrogen-free water, cooled and mixed with methanol and with a suitable buffer with stirring to produce a mixture containing 6 percent of methanol at a temperature of −2° C. and at a pH of 5.35 to 5.45. Under these conditions, a precipitate consisting essentially of alpha- and beta-globulins separated and was removed by centrifugation and filtration. The clarified supernatant liquid consisting of a methanolic aqueous solution containing the gamma-globulins and a small proportion of the beta-globulins together with some other minor protein constituents was mixed with additional methanol and the temperature and the pH thereof adjusted to produce a mixture containing 25 percent methanol at a temperature of −6° C. and a pH of 6.8 to 6.9. The resulting precipitate of desired proteins was separated by centrifugation and the supernatant from this step discarded. The precipitate from this step was suspended in a methanolic aqueous solution containing 17 percent methanol and having the temperature adjusted to −6° C. and a pH of 5.05 to 5.15. Under these conditions, the gamma-globulins were solubilized while the preponderance of the beta-globulins and other protein constituents remained insoluble.

The supernatant liquid portion containing the gamma-globulins was separated from insoluble constituents by centrifugation and filtration and the desired gamma-blobulin fraction precipitated therefrom by again adjusting the methanol content to 25 percent and the pH to 6.8 to 6.9 while maintaining the solution at —6° C. The precipitated gamma-globulin fraction was separated in the form of a moist paste by centrifugation and filtration. Said paste was dispersed in sufficient pyrogen-free water to produce a solution containing approximately 5 percent protein and 3 percent methanol. About 0.4 percent of glycine was dissolved in this suspension to serve as a protein stabilizer. The resulting protein solution was filtered through a bacteriological filter and fed at a temperature of about 1.7° C. to a Turba-Film Evaporator (Rodney-Hunt Machine Co.) at a rate of 0.3 kilogram per minute. In this apparatus a rotor revolving at high speed and carrying blades extending to within less than 0.1 inch of the cylindrical jacket maintains input fluid in a thin film on the jacket wall. The apparatus was operated under vacuum (22 millimeters of mercury) and the jacket was heated by steam to temperatures from about 65° to 75° C. Methanol-free aqueous gamma-globulin product having a protein content of about 22 percent was withdrawn from the evaporator at an output temperature of 18.9° C. This product was warmed to a temperature between 30° and 45° C., sterilized by filtration through a bacteriological filter and immediately thereafter cooled to a temperature of about 4° C. for storage. This product is suitable for dilution with pyrogen-free water to a standardized protein content of 16.5±1.5 percent for use as injectable humane immune serum globulin. In the final dilution, it is desirable to adjust the final glycine content to 0.3 molar and to add thimerosal to a final concentration of 1:10,000 to serve as a preservative. In commercial practice the final adjustment of concentration and addition of preservatives is carried out just before the final sterilization by filtration in order to insure sterility of the final product.

Alternatively, the gamma-globulin solution can be prepared by the procedure of Example III of U.S. Patent 2,437,060 except that methanol is substituted for the ethanol therein and the final gamma-globulin precipitate is not freeze-dried but rather is resuspended in distilled, pyrogen-free water and freed of methanol by the thin-film flash evaporation technique of Example 2.

In similar fashion, dilute solutions of globulins from the blood of dogs hyperimmunized against one or more canine diseases can be concentrated without denaturing the desired protein antibody fractions to produce a concentrate suitable for therapy in dogs exposed to said diseases.

EXAMPLE 3

The procedure of Example 2 is repeated except that the supernatant gamma-globulin solution, produced by suspending the intermediate fraction in aqueous 17 percent methanol solution, is clarified by centrifugation and thereafter by passage through a bacteriological filter and is then submitted directly to the flash evaporation procedure to produce the desired concentrated, methanol-free, aqueous solution of gamma-globulin.

We claim:

1. In a method for the separation of blood-protein fraction wherein such fractions are separated by adjusting the ionic strength, the hydrogen ion concentration and the methanol content of aqueous blood-protein suspensions, the improved method for concentrating one of said fractions from liquid, aqueous methanolic solution and simultaneously freeing same of methanol which comprises the steps of spreading said aqueous methanolic solution on a heated surface in a thin, rapidly flowing film at an introduction temperature of from about —6° C. to about 25° C., at which temperature the solution remains liquid, subjecting said film to vacuum to accomplish flash evaporation of water and methanol therefrom while adjusting the vacuum and the heat input to the heated surface to maintain the film of solution in the liquid state and withdrawing from the heated surface a concentrated, methanol-free, aqueous solution of the blood-protein fraction at a temperature above the freezing point thereof and below about 40° C.

2. A method according to claim 1 wherein the blood-protein fraction is human gamma-globulin.

3. A method according to claim 1 wherein the blood-protein fraction consists essentially of human alpha-globulins and serum albumin.

4. A method according to claim 1 wherein the blood fraction comprises globulins from the blood of dogs hyperimmunized against a canine disease.

5. A method which comprises separating a concentrated gamma globulin fraction from blood-proteins, said fraction having been precipitated as a moist paste from a solution adjusted to a methanol concentration of from about 20 to 25 percent, suspending said fraction in sufficient pyrogen-free water to provide a solution containing about 5 percent protein, maintaining the temperature of the resulting solution in the range from above the freezing point thereof to about 25° C., spreading said solution on a heated surface in a thin, rapidly flowing film, subjecting said film to vacuum to accomplish flash evaporation of water and methanol therefrom while adjusting the heat input to the heated surface to maintain the film in the liquid state, and withdrawing from the heated surface a concentrated, methanol-free, aqueous suspension of gamma-globulin at a temperature above the freezing point thereof and below about 40° C.

6. A method according to claim 5 wherein sufficient glycine is added to the aqueous protein solution prior to concentration to provide a content of glycine of about 0.3 molar in the final product.

7. A method in accordance with claim 5 wherein the concentrated aqueous product is sterilized by filtration through a bacteriological filter at a temperature of from about 30° to about 45° C.

References Cited

UNITED STATES PATENTS

| 2,390,074 | 12/1945 | Cohn | 260—122 |
| 2,437,060 | 3/1948 | Williams et al. | 260—112 |
| 2,469,193 | 5/1949 | Cohn | 260—112 |

OTHER REFERENCES

Chinese Journal of Physiology 1934, vol. VIII, pp. 97–102, 106–109, Lui Journal of Biological Chemistry, July 1946, pp. 109–106, Deutsch et al.

Journal of Biological Chemistry, vol. 158, pages 299–301.

WILLIAM H. SHORT, *Primary Examiner.*

H. E. SCHAIN, *Assistant Examiner.*